US011678399B2

(12) United States Patent
Kim et al.

(10) Patent No.: US 11,678,399 B2
(45) Date of Patent: Jun. 13, 2023

(54) METHOD AND APPARATUS FOR RESUMING ONLY SIGNALING RADIO BEARERS IN WIRELESS COMMUNICATION SYSTEM

(71) Applicant: LG Electronics Inc., Seoul (KR)

(72) Inventors: Taehun Kim, Seoul (KR); Bokyung Byun, Seoul (KR); Hyunjung Choe, Seoul (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 16/980,277

(22) PCT Filed: May 13, 2019

(86) PCT No.: PCT/KR2019/005720
§ 371 (c)(1),
(2) Date: Sep. 11, 2020

(87) PCT Pub. No.: WO2019/216730
PCT Pub. Date: Nov. 14, 2019

(65) Prior Publication Data
US 2021/0360730 A1 Nov. 18, 2021

(30) Foreign Application Priority Data
May 11, 2018 (KR) ........................ 10-2018-0054419

(51) Int. Cl.
*H04W 76/27* (2018.01)
*H04W 12/033* (2021.01)
*H04W 74/08* (2009.01)

(52) U.S. Cl.
CPC ......... *H04W 76/27* (2018.02); *H04W 12/033* (2021.01); *H04W 74/0833* (2013.01)

(58) Field of Classification Search
CPC .............. H04W 76/27; H04W 12/033; H04W 74/0833; H04W 74/085; H04W 4/70; H04W 74/04; H04W 84/045; H04W 88/02
See application file for complete search history.

(56) References Cited

U.S. PATENT DOCUMENTS

2017/0331670 A1* 11/2017 Parkvall ............... H04J 11/0079
2018/0234941 A1*  8/2018 Kim .................... H04W 68/005
2018/0324854 A1* 11/2018 Phuyal ............... H04W 74/085
(Continued)

FOREIGN PATENT DOCUMENTS

KR    20180035719      4/2018
WO    WO2017126922     7/2017

OTHER PUBLICATIONS

WO 2017/200477 A1 (Year: 2017).*
(Continued)

*Primary Examiner* — Rushil Parimal Sampat
(74) *Attorney, Agent, or Firm* — Fish & Richardson P.C.

(57) ABSTRACT

A method and apparatus for resuming only signaling radio bearers (SRBs) in a wireless communication system is provided. A wireless device triggers a signaling while the wireless device is in a radio resource control (RRC) inactive state, and resumes only SRB and transmits a message 3 (MSG3) of a random access procedure to a network when an early data transmission (EDT) triggering condition for transmission via the MSG3 is fulfilled. The MSG3 includes the signaling.

8 Claims, 15 Drawing Sheets

(56) References Cited

U.S. PATENT DOCUMENTS

2019/0124710 A1* 4/2019 Stattin .................. H04L 63/061
2020/0037345 A1* 1/2020 Ryoo ................ H04W 72/1284
2020/0120741 A1* 4/2020 Lindheimer .......... H04W 76/19
2020/0187242 A1* 6/2020 Hoglund ........... H04W 72/1268

OTHER PUBLICATIONS

WO 2018/062957 A1 (Year: 2018).*
Ericsson, "UP solution for early data transmission," R2-1710522, 3GPP TSG-RAN WG2 #99bis, Prague, Czech Republic, Oct. 9-13, 2017, 5 pages.
LG Electronics Inc., "UE Initial Access procedure for RRC connection resume," R3-174378, 3GPP TSG-RAN WG3 Meeting #98, Reno, NV, USA, Nov. 27-Dec. 1, 2017, 6 pages.
ZTE Corporation, Sanechips, "RRC Resume with default SRB1 configuration," R2-1804447, 3GPP TSG-RAN WG2 Meeting #101bis, Sanya, China, Apr. 16-20, 2018, 5 pages.

* cited by examiner

METHOD AND APPARATUS FOR RESUMING ONLY SIGNALING RADIO BEARERS IN WIRELESS COMMUNICATION SYSTEM

CROSS-REFERENCE TO RELATED APPLICATIONS

This application is a National Stage application under 35 U.S.C. § 371 of International Application No. PCT/KR2019/005720, filed on May 13, 2019, which claims the benefit of Korean Patent Application No. 10-2018-0054419, filed on May 11, 2018. The disclosures of the prior applications are incorporated by reference in their entirety.

TECHNICAL FIELD

The present invention relates to wireless communications, and more particularly, to a method and apparatus for resuming only signaling radio bearers (SRBs) in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In Rel-13, narrowband internet-of-things (NB-IoT) and LTE for machine-type communication (LTE-M) were standardized to provide wide-area connectivity for IoT. The technologies in R31-14 evolved beyond the basic functionality specified in Rel-13. In Rel-15, to optimize the support for infrequent small data packet transmissions, a mechanism for data transmission during the random access procedure is specified for NB-IoT and LTE-M. This mechanism may be referred to as early data transmission (EDT) and can improve the device battery life and reduces the message latency.

SUMMARY

EDT can be implemented by two aspects, one of which is control plane cellular IoT (CIoT) evolved packet system (EPS) optimizations and the other is user plane CIoT EPS optimizations. Both cases may be applied only to data, not signaling, but there may be a case that non-access stratum (NAS) signaling is required to be transmitted by using EDT. Furthermore, all radio bearers does not need to be resumed.

In an aspect, a method performed by a wireless device in a wireless communication system is provided. The method includes triggering a signaling while the wireless device is in a radio resource control (RRC) inactive state, resuming only a signaling radio bearer (SRB) and transmitting a message 3 (MSG3) of a random access procedure to a network when an early data transmission (EDT) triggering condition for transmission via the MSG3 is fulfilled, wherein the MSG3 includes the signaling, and receiving a message 4 (MSG4) of the random access procedure from the network.

In another aspect, a wireless device in a wireless communication system is provided. The wireless device includes a memory, a transceiver, and a processor, operably coupled to the memory and the transceiver. The processor is configured to trigger a signaling while the wireless device is in a radio resource control (RRC) inactive state, and to resume only a signaling radio bearer (SRB). The transceiver is configured to transmit a message 3 (MSG3) of a random access procedure to a network when an early data transmission (EDT) triggering condition for transmission via the MSG3 is fulfilled. The MSG3 includes the signaling. The transceiver is configured to receive a message 4 (MSG4) of the random access procedure from the network.

In another aspect, a processor for a wireless device in a wireless communication system is provided. The processor is configured to trigger a signaling while the wireless device is in a radio resource control (RRC) inactive state, resume only a signaling radio bearer (SRB), control the wireless device to transmit a message 3 (MSG3) of a random access procedure to a network when an early data transmission (EDT) triggering condition for transmission via the MSG3 is fulfilled, wherein the MSG3 includes the signaling, and control the wireless device to receive a message 4 (MSG4) of the random access procedure from the network.

When the UE is in RRC_INACTIVE, the UE can transmit signaling (e.g. control plane EDT) by using EDT.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
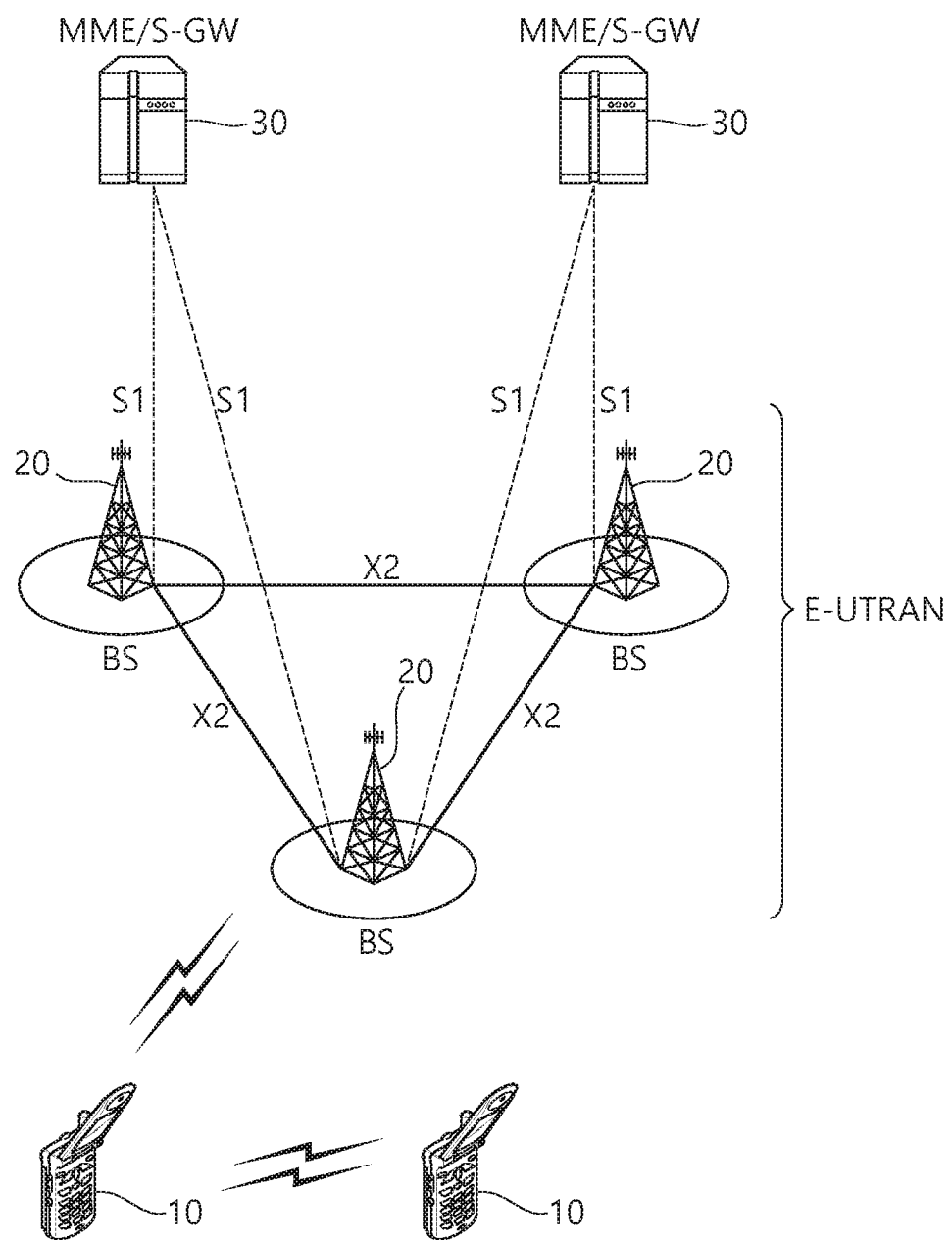
FIG. 1 shows an example of a wireless communication system to which the technical features of the present invention can be applied.

FIG. 1 shows an example of a wireless communication system to which the technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
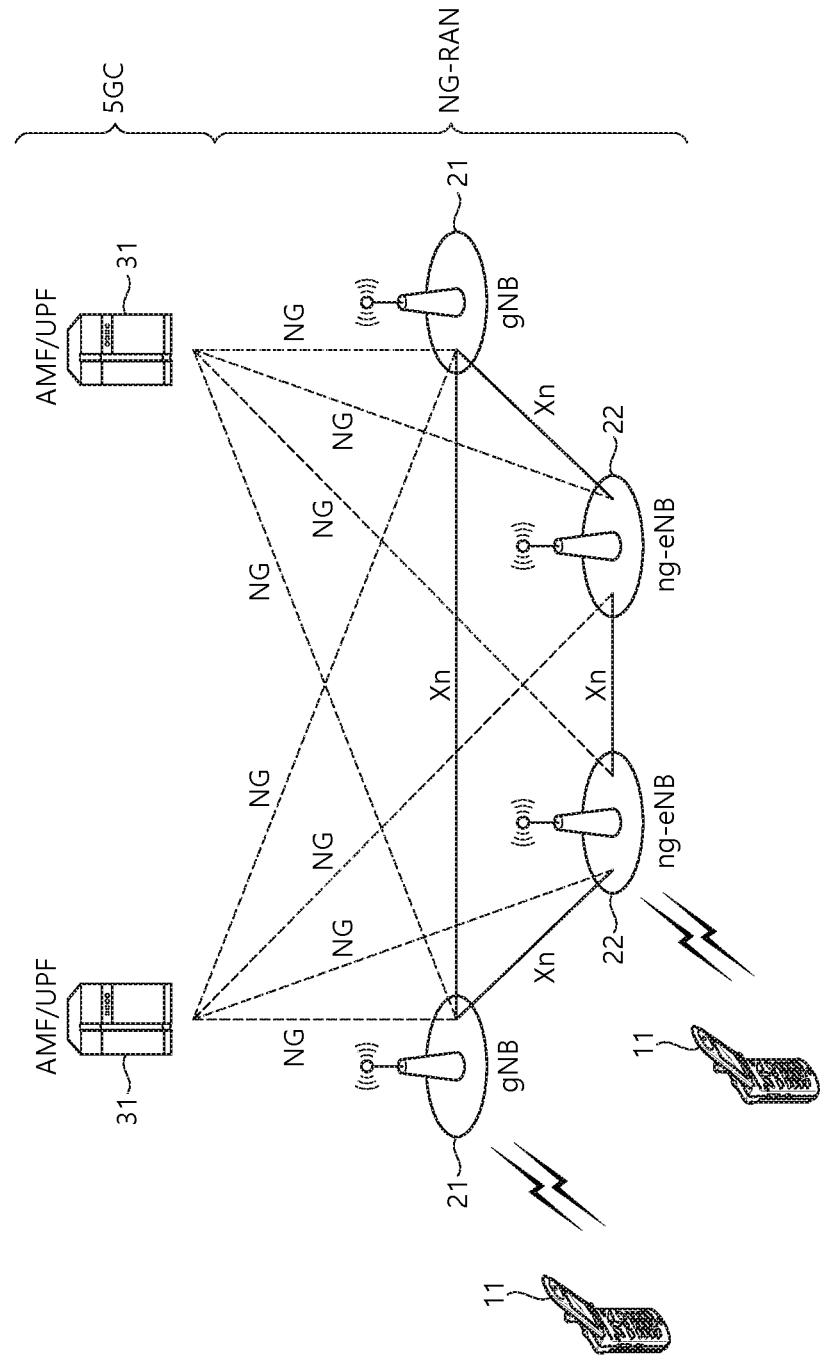
FIG. 2 shows another example of a wireless communication system to which the technical features of the present invention can be applied.

FIG. 2 shows another example of a wireless communication system to which the technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
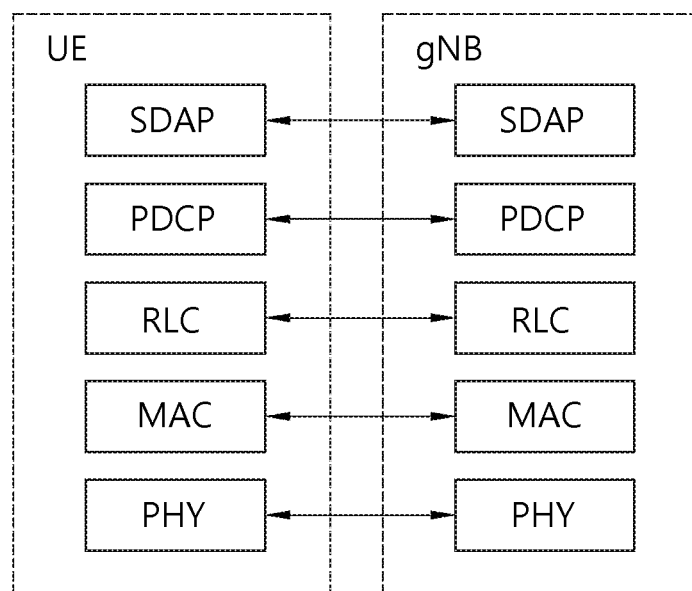
FIG. 3 shows a block diagram of a user plane protocol stack to which the technical features of the present invention can be applied.
Figure 4:
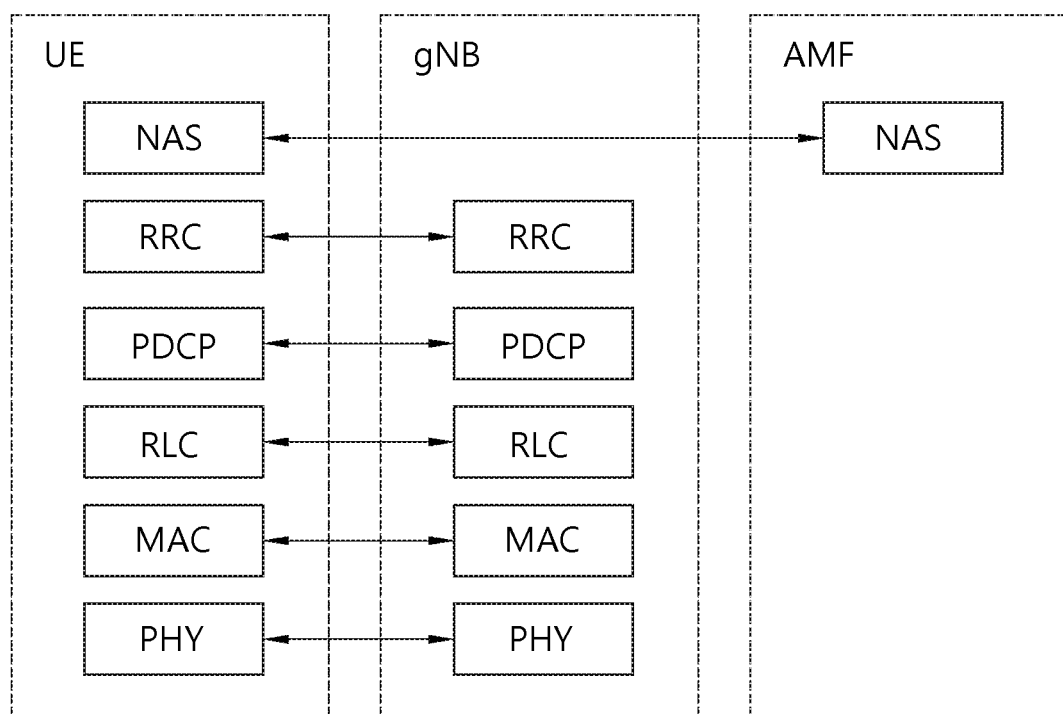
FIG. 4 shows a block diagram of a control plane protocol stack to which the technical features of the present invention can be applied.

FIG. 3 shows a block diagram of a user plane protocol stack to which the technical features of the present invention can be applied. FIG. 4 shows a block diagram of a control plane protocol stack to which the technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
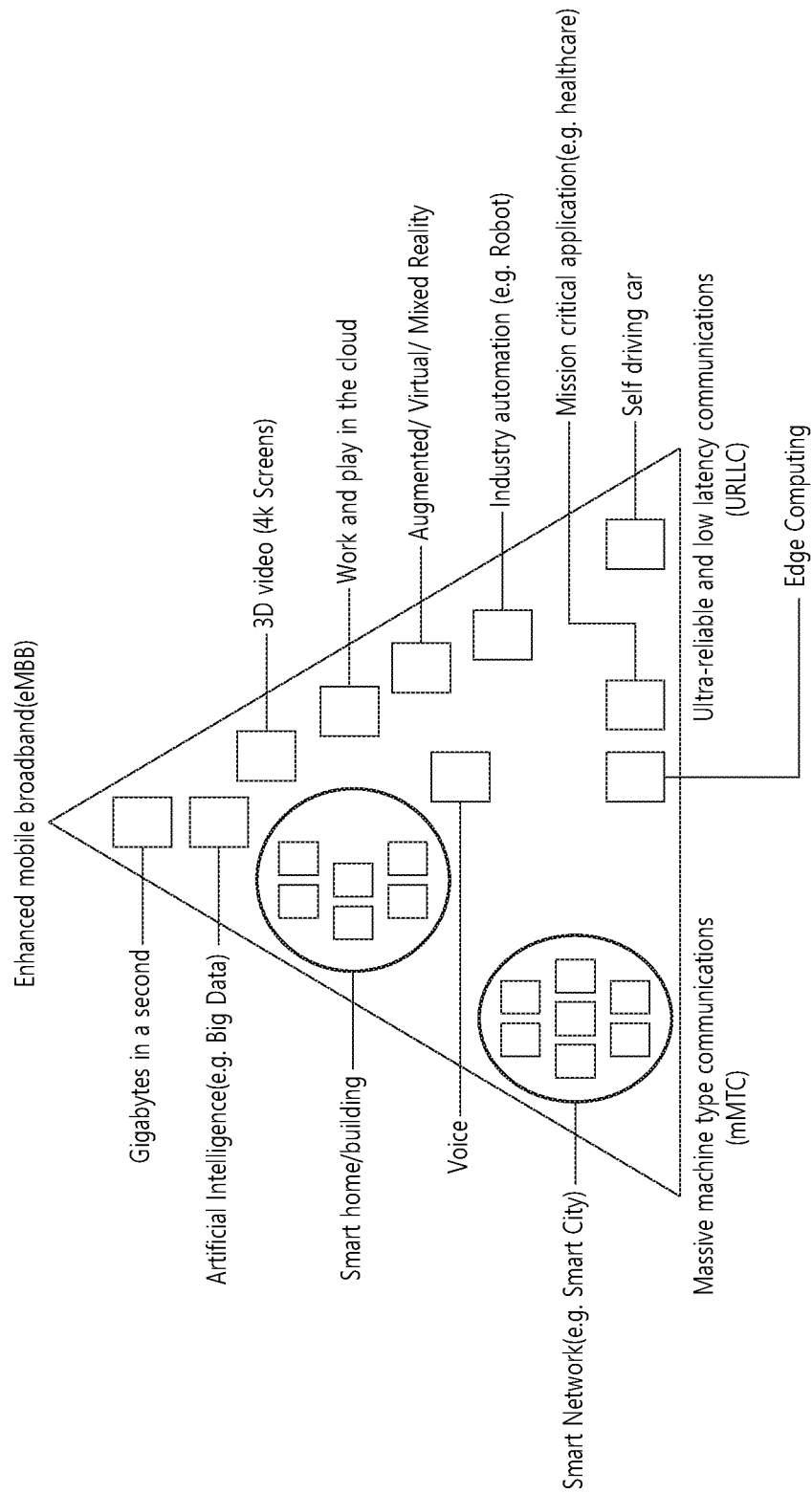
FIG. 5 shows examples of 5G usage scenarios to which the technical features of the present invention can be applied.

FIG. 5 shows examples of 5G usage scenarios to which the technical features of the present invention can be applied. The 5G usage scenarios shown in FIG. 5 are only exemplary, and the technical features of the present invention can be applied to other 5G usage scenarios which are not shown in FIG. 5.

Referring to FIG. 5, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 5 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 6:
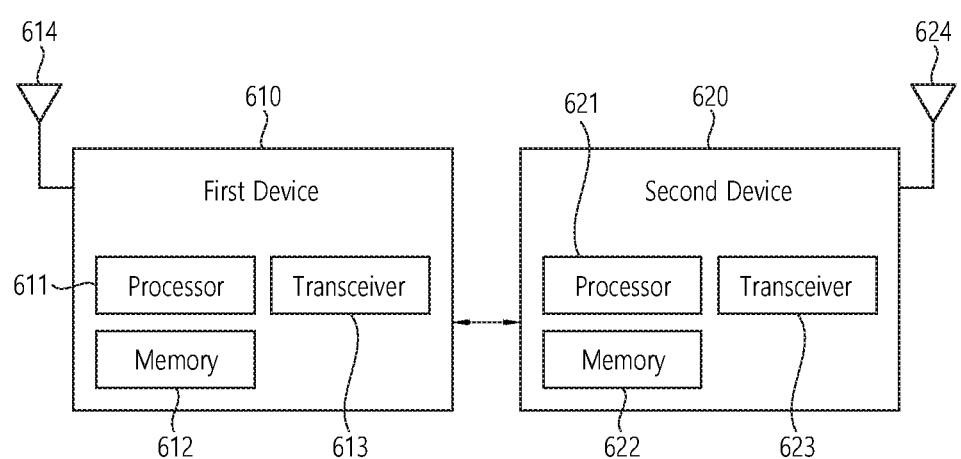
FIG. 6 shows an example of a wireless communication system to which the technical features of the present invention can be applied.

FIG. 6 shows an example of a wireless communication system to which the technical features of the present invention can be applied.

Referring to FIG. 6, the wireless communication system may include a first device 610 and a second device 620.

The first device 610 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 620 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 610 may include at least one or more processors, such as a processor 611, at least one memory, such as a memory 612, and at least one transceiver, such as a transceiver 613. The processor 611 may perform the functions, procedures, and/or methods of the present invention described below. The processor 611 may perform one or more protocols. For example, the processor 611 may perform one or more layers of the air interface protocol. The memory 612 is connected to the processor 611 and may store various types of information and/or instructions. The transceiver 613 is connected to the processor 611 and may be controlled to transmit and receive wireless signals.

The second device 620 may include at least one or more processors, such as a processor 621, at least one memory, such as a memory 622, and at least one transceiver, such as a transceiver 623. The processor 621 may perform the functions, procedures, and/or methods of the present invention described below. The processor 621 may perform one or more protocols. For example, the processor 621 may perform one or more layers of the air interface protocol. The memory 622 is connected to the processor 621 and may store various types of information and/or instructions. The transceiver 623 is connected to the processor 621 and may be controlled to transmit and receive wireless signals.

The memory 612, 622 may be connected internally or externally to the processor 611, 612, or may be connected to other processors via a variety of technologies such as wired or wireless connections.

The first device 610 and/or the second device 620 may have more than one antenna. For example, antenna 614 and/or antenna 624 may be configured to transmit and receive wireless signals.

The RRC inactive state is described in detail. The following description of the RRC inactive state will be described by taking NR as an example, but it can be applied to LTE-A without loss of generality. For example, in the following description, NG-RAN node/gNB may be replaced with eNB and/or more generally BS, and AMF may be replaced with MME.

The RRC inactive state applies to NG-RAN node. The AMF, based on network configuration, may provide RRC inactive assistance information to the NG-RAN node, to assist the NG-RAN's decision whether the UE can be sent to RRC inactive state.

The RRC inactive assistance information includes at least one of the followings.
  UE specific DRX values
  The registration area provided to the UE
  Periodic registration update timer
  If the AMF has enabled mobile initiated connection only (MICO) mode for the UE, an indication that the UE is in MICO mode.
  Information from the UE permanent identifier that allows the NG-RAN node to calculate the UE's RAN paging occasions.

The RRC inactive assistance information mentioned above is provided by the AMF during N2 activation with the (new) serving NG-RAN node (i.e. during registration, service request, handover) to assist the NG-RAN node's decision whether the UE can be sent to RRC inactive state. RRC inactive state is part of RRC state machine, and it is up to the NG-RAN node to determine the conditions to enter RRC inactive state. If any of the parameters included in the RRC inactive assistance information changes as the result of NAS procedure, the AMF shall update the RRC inactive assistance information to the NG-RAN node.

When the UE is in connection management connected state (CM-CONNECTED), if the AMF has provided RRC inactive assistance information, the NG-RAN node may decide to move a UE to CM-CONNECTED with RRC inactive state.

The state of the N2 and N3 reference points are not changed by the UE entering CM-CONNECTED with RRC inactive state. A UE in RRC inactive state is aware of the RAN notification area.

The 5GC network is not aware of the UE transitions between CM-CONNECTED with RRC_CONNECTED and CM-CONNECTED with RRC inactive state, unless the 5GC network is notified via N2 notification procedure.

At transition into CM-CONNECTED with RRC inactive state, the NG-RAN node configures the UE with a periodic RAN notification area update timer taking into account the value of the periodic registration update timer value indicated in the RRC inactive assistance information, and uses a guard timer with a value longer than the RAN notification area update timer value provided to the UE.

If the periodic RAN notification area update guard timer expires in NG-RAN node, the NG-RAN node shall initiate access network (AN) release procedure.

When the UE is in CM-CONNECTED with RRC inactive state, the UE performs PLMN selection procedures for connection management idle state (CM-IDLE).

When the UE is CM-CONNECTED with RRC inactive state, the UE may resume the RRC connection due to at least one of the followings.

UL data pending

Mobile originated (MO) NAS signaling procedure
As a response to RAN paging
Notifying the network that it has left the RAN notification area
Upon periodic RAN update timer expiration.

If the UE resumes the connection in a different NG-RAN node within the same PLMN, the UE AS context is retrieved from the old NG-RAN node and a procedure is triggered towards the CN.

If the RAN paging procedure is not successful in establishing contact with the UE, the procedure shall be handled by the network as follows.

If NG-RAN node has at least one pending NAS PDU for transmission, the NG-RAN node shall initiate the AN release procedure to move the UE CM state in the AMF to CM-IDLE and indicate to the AMF the NAS non-delivery.

If NG-RAN node has only pending user plane data for transmission, the NG-RAN node may keep the N2 connection active or initiate the AN release procedure based on local configuration in NG-RAN node.

The user plane data which triggers the RAN paging can be lost, e.g. in the case of RAN paging failure.

If a UE in CM-CONNECTED with RRC inactive state performs cell selection to GERAN/UTRAN/E-UTRAN, it shall follow idle mode procedures of the selected RAT.

In addition, a UE in CM-CONNECTED state with RRC inactive state shall enter CM-IDLE and initiates the NAS signaling recovery in at least one of the following cases.

If RRC resume procedure fails;
If the UE receives core network paging;
If the periodic RAN notification area update timer expires and the UE cannot successfully resume the RRC connection;
In any other failure scenario that cannot be resolved in RRC inactive state and requires the UE to move to CM-IDLE.

When the UE is in CM-CONNECTED with RRC inactive state, if NG-RAN node has received location reporting control message from AMF with the reporting type indicating single stand-alone report, the NG-RAN node shall perform RAN paging before reporting the location to AMF.

When the UE is in CM-CONNECTED with RRC inactive state, if NG-RAN node has received location reporting control message from AMF with the reporting type indicating continuously reporting whenever the UE changes cell, the NG-RAN node shall send a location report message to AMF including UE's last known location with time stamp.

When the UE is CM-CONNECTED with RRC inactive state, if the AMF receives Nudm_UEContext Management_DeregistrationNotification from user data management (UDM), the AMF shall initiate AN release procedure.

When UE is in CM-CONNECTED with RRC inactive state, if NG-RAN node has received location reporting control message from AMF with the reporting type of the area of interest based reporting, the NG-RAN node shall send a location report message to AMF including UE presence in the area of interest (i.e. IN, OUT, or UNKNOWN) and the UE's last known location with time stamp.

Figure 7:
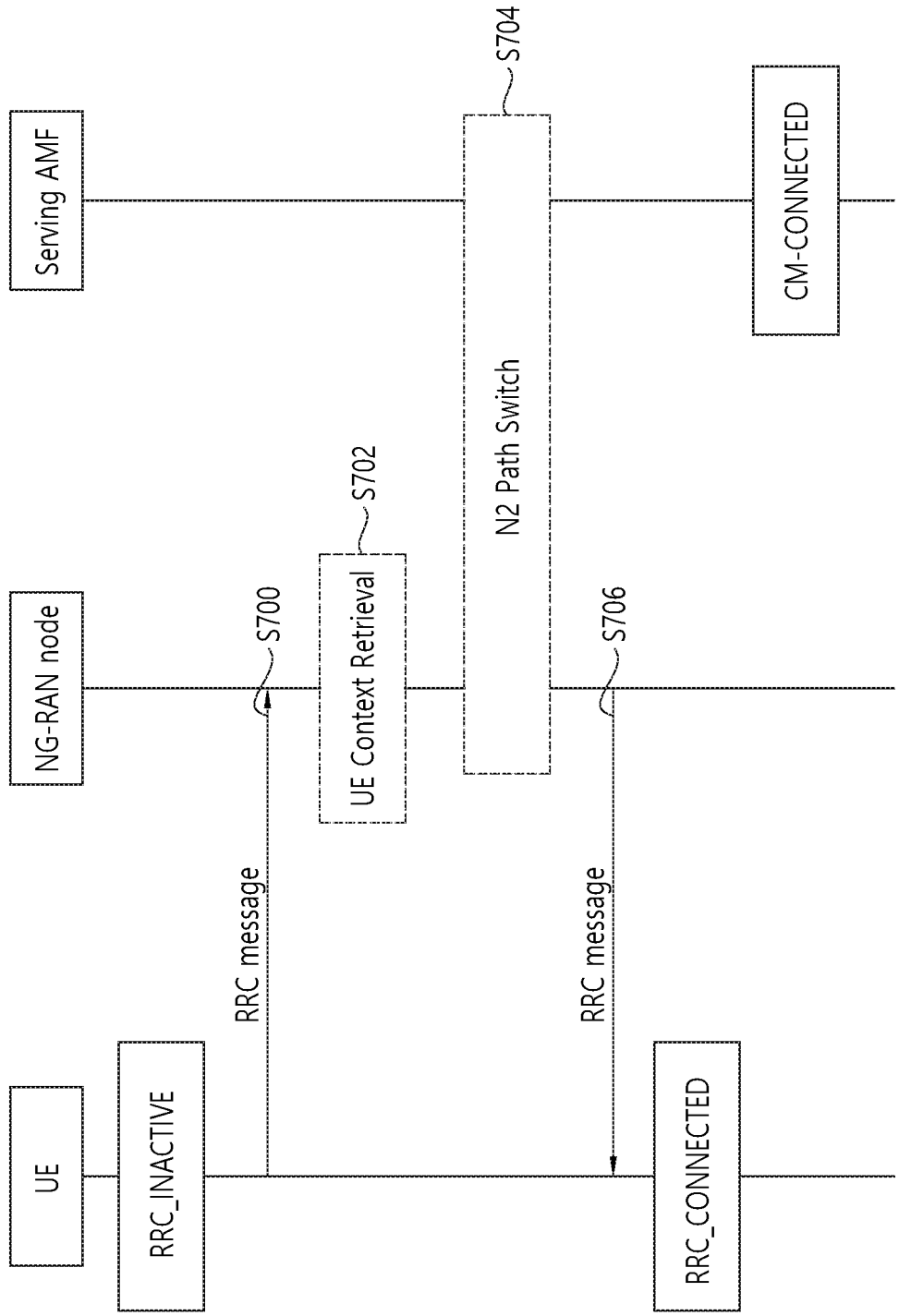
FIG. 7 shows an example of a connection resume procedure to which the technical features of the present invention can be applied.

FIG. 7 shows an example of a connection resume procedure to which the technical features of the present invention can be applied. The connection resume procedure is used by the UE to perform RRC inactive to RRC connected state transition.

In step S700, while the UE is in RRC_INACTIVE, the UE transmits an RRC message to the NG-RAN node to initiate the transition from RRC_INACTIVE to RRC_CONNECTED. The UE provides its resume ID needed by the NG-RAN node to access the UE's stored context. The RRC message may be RRCConnectionResumeRequest message which will be described in detail below.

In step S702, the NG-RAN node may conditionally perform UE context retrieval. The UE context retrieval is performed when the UE context associated with the UE attempting to resume its connection is not locally available at the accessed NG-RAN node.

In step S704, the NG-RAN node may conditionally perform N2 path switch procedure towards the serving AMF. If the target NG-RAN node is different from the old NG-RAN node, the serving NG-RAN node initiates N2 path switch procedure and including Xn data forwarding. The NG-RAN node sends UE notification message to report that the UE is in RRC_CONNECTED if the AMF requested N2 notification to the NG-RAN node.

In step S706, the NG-RAN node transmits an RRC message to the UE to confirm to the UE that the UE has entered RRC_CONNECTED. The RRC message includes resume ID of the UE.

Table 1 shows an example of RRCConnectionResumeRequest message. The RRCConnectionResumeRequest message may be the RRC message which is transmitted in step S700 of FIG. 7. The RRCConnectionResumeRequest message is used to request the resumption of a suspended RRC connection. The SRB for the RRCConnectionResumeRequest message may be SRB0. The RRCConnectionResumeRequest message may be transmitted via logical channel CCCH.

TABLE 1

-- ASN1START
RRCConnectionResumeRequest-r13 ::= SEQUENCE {
  criticalExtensions                              CHOICE {
    rrcConnectionResumeRequest-r13                      RRCConnectionResumeRequest-r13-IEs, TABLE 1-continued

```
    criticalExtensionsFuture            SEQUENCE { }
  }
}
RRCConnectionResumeRequest-r13-IEs ::= SEQUENCE {
resumeIdentity-r13                      CHOICE {
    resumeID-r13                            ResumeIdentity-r13,
    truncatedResumeID-r13                   BIT STRING (SIZE (24))
},
shortResumeMAC-I-r13                    BIT STRING (SIZE (16)),
resumeCause-r13                         ResumeCause,
spare                                   BIT STRING (SIZE (1))
}
ResumeCause ::= ENUMERATED {
        emergency, highPriorityAccess, mt-Access, mo-Signalling,
        mo-Data, delayTolerantAccess-v1020, mo-VoiceCall-v1280,
spare1}
-- ASN1STOP
```

Referring to Table 1, the resumeCause field provides the resume cause for the RRC connection resume request as provided by the upper layers. The resumeIdentity field indicates UE identity to facilitate UE context retrieval at BS. The shortResumeMAC-I field indicates authentication token to facilitate UE authentication at BS.Transport of NAS messages and early data transmission (EDT) are described. The following description of the RRC inactive state will be described by taking LTE-A as an example, but it can be applied to NR without loss of generality. For example, in the following description, eNB may be replaced with NG-RAN node/gNB and/or more generally BS, and MME may be replaced with AMF.

The AS provides reliable in-sequence delivery of NAS messages in a cell. During handover, message loss or duplication of NAS messages can occur.

In E-UTRAN, NAS messages are either concatenated with RRC messages or carried in RRC without concatenation. Upon arrival of concurrent NAS messages for the same UE requiring both concatenation with RRC for the high priority queue and also without concatenation for the lower priority queue, the messages are first queued as necessary to maintain in-sequence delivery.

In DL, when an EPS bearer establishment or release procedure is triggered, or for EDT, the NAS message should normally be concatenated with the associated RRC message. When the EPS bearer is modified and when the modification also depends on a modification of the radio bearer, the NAS message and associated RRC message should normally be concatenated. Concatenation of DL NAS with RRC message is not allowed otherwise. In UL concatenation of NAS messages with RRC message is used only for transferring the initial NAS message during connection setup and for EDT. Initial direct transfer is not used in E-UTRAN and no NAS message is concatenated with RRC connection request.

Multiple NAS messages can be sent in a single DL RRC message during EPS bearer establishment or modification. In this case, the order of the NAS messages in the RRC message shall be kept the same as that in the corresponding S1-AP message in order to ensure the in-sequence delivery of NAS messages.

NAS messages are integrity protected and ciphered by PDCP, in addition to the integrity protection and ciphering performed by NAS.

EDT allows one UL data transmission optionally followed by one DL data transmission during the random access procedure.

EDT is triggered when the upper layers have requested the establishment or resumption of the RRC connection for MO data (i.e. not signaling or short message service (SMS)) and the UL data size is less than or equal to a transport block size (TBS) indicated in the system information. EDT is not used for data over the control plane when using the user plane cellular IoT (CIoT) EPS optimizations.

EDT may be only applicable to bandwidth reduced low complexity (BL) UEs, UEs in enhanced coverage and/or narrowband IoT (NB-IoT) UEs.

Figure 8:
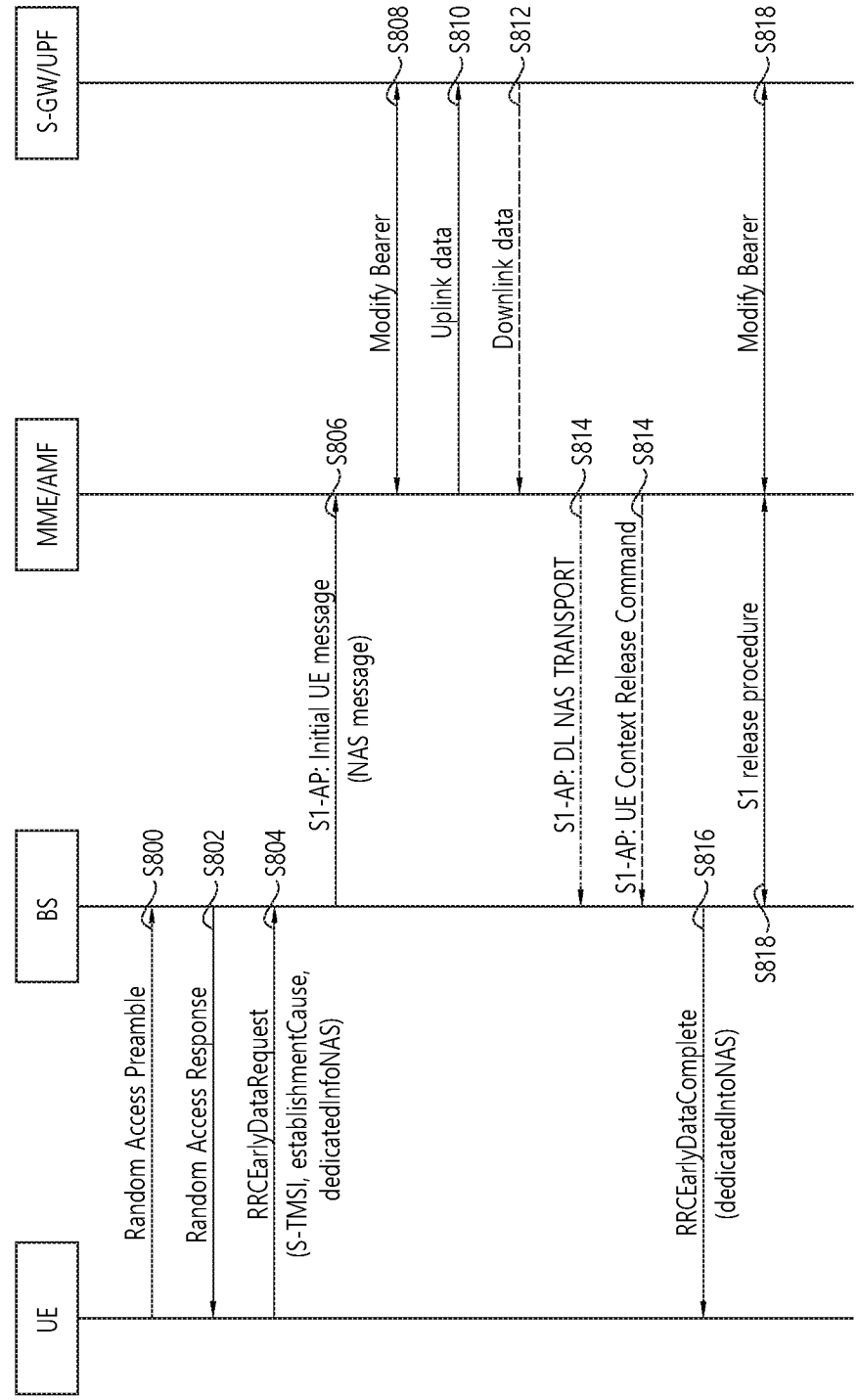
FIG. 8 shows an example of EDT for control plane CIoT EPS optimizations to which the technical features of the present invention can be applied.

FIG. 8 shows an example of EDT for control plane CIoT EPS optimizations to which the technical features of the present invention can be applied. EDT for control plane (CP) CIoT EPS optimizations is characterized as below.

UL user data are transmitted in a NAS message concatenated in UL RRCEarlyDataRequest message on CCCH.

DL user data are optionally transmitted in a NAS message embedded in DL RRCEarlyDataComplete message on CCCH.

There is no transition to RRC_CONNECTED.

Referring to FIG. 8, upon connection establishment request for MO data from the upper layers, the UE initiates the EDT procedure and selects a random access preamble configured for EDT. In step S800, the UE transmits the random access preamble to the BS, and in step S802, the BS transmits a random access response to the UE as a response to the random access preamble.

In step S804, the UE sends RRCEarlyDataRequest message concatenating the user data on CCCH. The RRCEarlyDataRequest message may further include SAE temporary mobile subscriber identity (S-TMSI) and/or establishment cause.

In step S806, the BS initiates the S1-AP initial UE message procedure to forward the NAS message and establish the S1 connection.

In step S808, the MME requests the S-GW to re-activate the EPS bearers for the UE.

In step S810, the MME sends the UL data to the S-GW.

In step S812, if DL data are available, the S-GW sends the DL data to the MME.

In step S814, if DL data are received from the S-GW, the MME forwards the DL data to the BS. If no further data are expected, the MME can release the connection immediately.

In step S816, if no further data are expected, the BS can send the RRCEarlyDataComplete message on CCCH to keep the UE in RRC_IDLE. If the DL data were received in step S814, they are concatenated in RRCEarlyDataComplete message.

In step S818, the S1 connection is released and the EPS bearers are deactivated.

If the MME or the BS decides to move the UE in RRC_CONNECTED, RRCConnectionSetup message is sent in step S816 to fall back to the legacy RRC connection establishment procedure.

Figure 9:
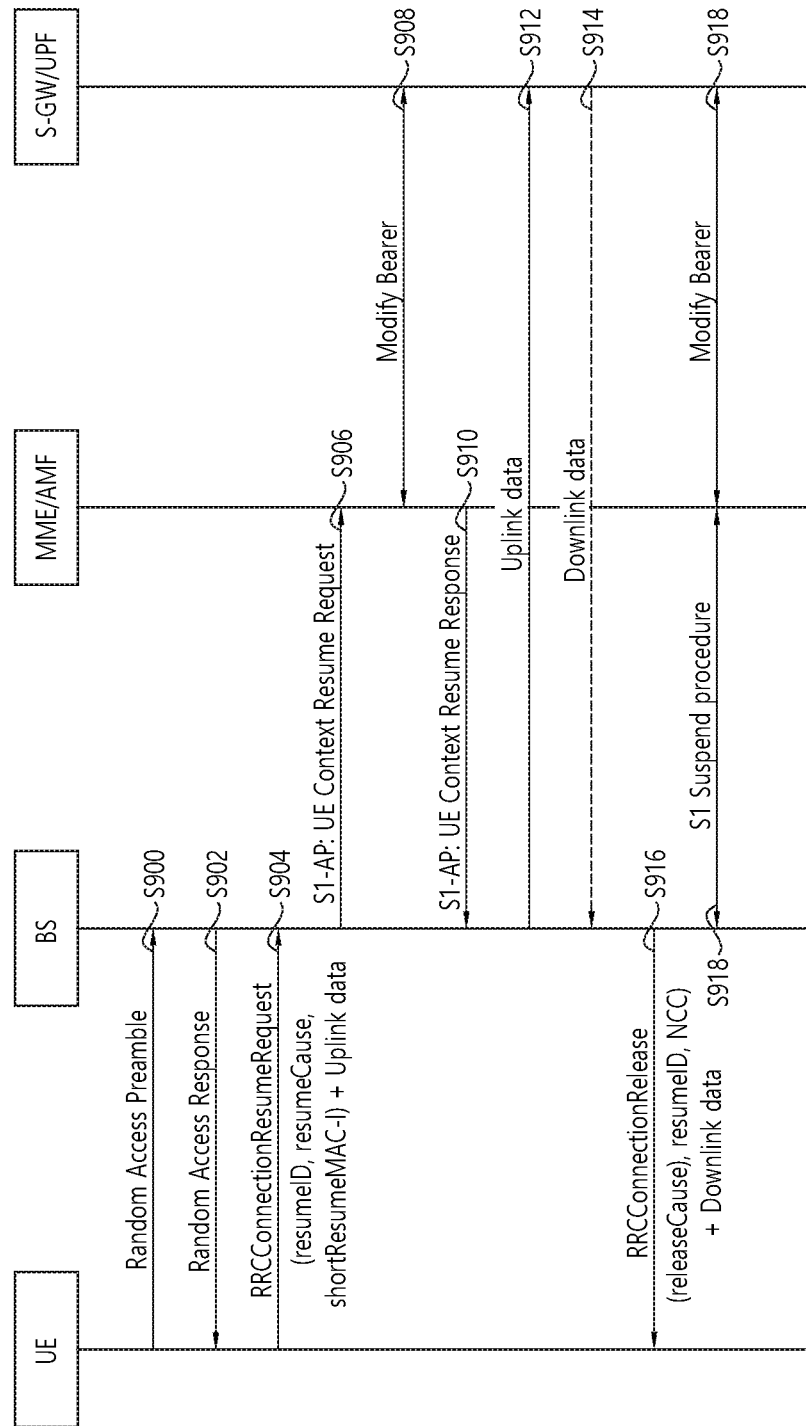
FIG. 9 shows an example of EDT for user plane CIoT EPS optimizations to which the technical features of the present invention can be applied.

FIG. 9 shows an example of EDT for user plane CIoT EPS optimizations to which the technical features of the present invention can be applied. EDT for user plane (UP) CIoT EPS optimizations is characterized as below.

UL user data are transmitted on DTCH multiplexed with UL RRCConnectionResumeRequest message on CCCH.

DL user data are optionally transmitted on DTCH multiplexed with DL RRCConnectionRelease message on DCCH.

The user data in UL and DL are ciphered. The keys are derived using the NextHopChainingCount provided in the RRCConnectionRelease message of the previous RRC connection.

There is no transition to RRC_CONNECTED.

Referring to FIG. 9, upon connection resumption request for MO data from the upper layers, the UE initiates the EDT procedure and selects a random access preamble configured for EDT. In step S900, the UE transmits the random access preamble to the BS, and in step S902, the BS transmits a random access response to the UE as a response to the random access preamble.

In step S904, the UE sends an RRCConnectionResumeRequest to the BS, including its Resume ID, the establishment cause, and an authentication token (i.e. shortResumeMAC-I). The UE resumes all SRBs and DRBs, derives new security keys using the next hop chaining counter (NCC) provided in the RRCConnectionRelease message of the previous connection and re-establishes the AS security. The user data are ciphered and transmitted on DTCH multiplexed with the RRCConnectionResumeRequest message on CCCH.

In step S906, the BS initiates the S1-AP context resume procedure to resume the S1 connection and re-activate the S1-U bearers.

In step S908, the MME requests the S-GW to re-activate the S1-U bearers for the UE.

In step S910, the MME confirms the UE context resumption to the BS.

In step S912, the UL data are delivered to the S-GW.

In step S914, if DL data are available, the S-GW sends the DL data to the BS.

In step S916, if no further data are expected from the S-GW, the BS can send the RRCConnectionRelease message to keep the UE in RRC_IDLE. The message includes the release Cause set to rrc-Suspend, the resumeID and the NextHopChainingCount which are stored by the UE. If DL data were received in step S914, they are sent ciphered on DTCH multiplexed with the RRCConnectionRelease message on DCCH.

In step S918, the S1 connection is suspended and the S1-U bearers are deactivated.

If the MME or BS decides the UE to move in RRC_CONNECTED, RRCConnectionResume message is sent in step S916 to fall back to the legacy RRC Connection resume procedure.

Contention based random access procedure described. The following description of the RRC inactive state will be described by taking LTE-A as an example, but it can be applied to NR without loss of generality. For example, in the following description, eNB may be replaced with NG-RAN node/gNB and/or more generally BS, and MME may be replaced with AMF.

Figure 10:
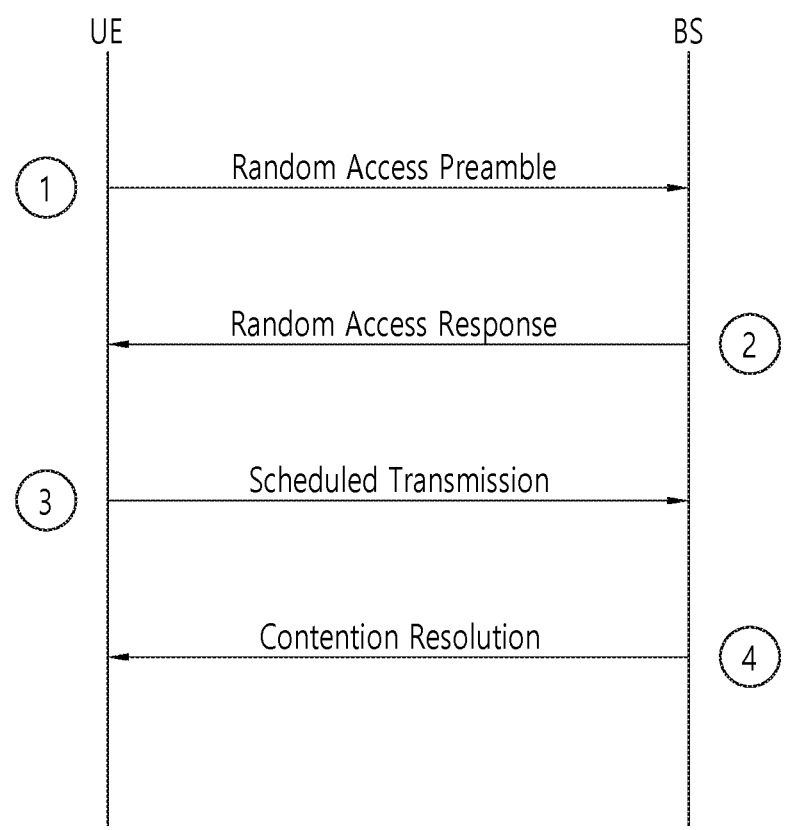
FIG. 10 shows an example of a contention based random access procedure to which the technical features of the present invention can be applied.

FIG. 10 shows an example of a contention based random access procedure to which the technical features of the present invention can be applied. The four steps of the contention based random access procedures are as follows.

(1) Message 1 (or, MSG1): Random access preamble on RACH in UL

There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

(2) Message 2 (or, MSG2): Random access response generated by MAC on DL-SCH

Semi-synchronous (within a flexible window of which the size is one or more TTI) with message 1

No HARQ

Addressed to random access radio network temporary identity (RA-RNTI) on PDCCH

Conveys at least RA-preamble identifier, timing alignment information for the primary timing advance group (pTAG), initial UL grant and assignment of temporary cell RNTI (C-RNTI) (which may or may not be made permanent upon contention resolution);

Intended for a variable number of UEs in one DL-SCH message.

(3) Message 3 (or, MSG3): First scheduled UL transmission on UL-SCH

Uses HARQ

Size of the transport blocks depends on the UL grant conveyed in step 2.

For initial access: Conveys the RRC connection request generated by the RRC layer and transmitted via CCCH/Conveys at least NAS UE identifier but no NAS message For RRC connection re-establishment procedure: Conveys the RRC connection re-establishment request generated by the RRC layer and transmitted via CCCH/Does not contain any NAS message.

After handover, in the target cell: Conveys the ciphered and integrity protected RRC handover confirm generated by the RRC layer and transmitted via DCCH/Conveys the C-RNTI of the UE (which was allocated via the handover command)/Includes an UL buffer status report (BSR) when possible.

For other events: Conveys at least the C-RNTI of the UE

In the procedure to resume the RRC connection: Conveys the RRC connection resume request generated by the RRC layer and transmitted via CCCH/Conveys a resume ID to resume the RRC connection;

For NB-IoT:

1) In the procedure to setup the RRC connection: An indication of the amount of data for subsequent transmission(s) on SRB or DRB can be indicated.

2) For EDT for control plane CIoT EPS optimizations: Conveys the RRC early data request generated by the RRC layer and transmitted via CCCH/Conveys at least NAS UE identifier and user data concatenated in a NAS message.

3) For EDT for user plane CIoT EPS optimizations: Conveys the RRC resume request generated by the RRC layer and transmitted via CCCH/Conveys a resume ID to resume the RRC connection/Conveys ciphered user data transmitted via DTCH.

(4) Message 4 (or, MSG4): Contention resolution on DL
Early contention resolution shall be used i.e. BS does not wait for NAS reply before resolving contention
Not synchronized with message 3
HARQ is supported
Addressed to the Temporary C-RNTI on PDCCH for initial access and after radio link failure and/or the C-RNTI on PDCCH for UE in RRC_CONNECTED
HARQ feedback is transmitted only by the UE which detects its own UE identity, as provided in message 3, echoed in the contention resolution message.

The temporary C-RNTI is promoted to C-RNTI for a UE which detects RA success and does not already have a C-RNTI. It is dropped by others. A UE which detects RA success and already has a C-RNTI, resumes using its C-RNTI.

When carrier aggregation (CA) is configured, the first three steps of the contention based random access procedures occur on the primary cell (PCell) while contention resolution (step 4) can be cross-scheduled by the PCell.

When dual connectivity (DC) is configured, the first three steps of the contention based random access procedures occur on the PCell in master cell group (MCG) and primary secondary cell (PSCell) in secondary cell group (SCG). When CA is configured in SCG, the first three steps of the contention based random access procedures occur on the PSCell while contention resolution (step 4) can be cross-scheduled by the PSCell.

RRC connection re-establishment procedure is described. The following description of the RRC inactive state will be described by taking LTE-A as an example, but it can be applied to NR without loss of generality. For example, in the following description, eNB may be replaced with NG-RAN node/gNB and/or more generally BS, and MME may be replaced with AMF.

The purpose of the RRC connection re-establishment procedure is to re-establish the RRC connection, which involves the resumption of SRB1 (SRB1bis for a NB-IoT UE for which AS security has not been activated) operation, the re-activation of security (except for a NB-IoT UE for which AS security has not been activated) and the configuration of only the PCell.

Except for a NB-IoT UE for which AS security has not been activated, a UE in RRC_CONNECTED, for which security has been activated, may initiate the RRC connection re-establishment procedure in order to continue the RRC connection. The connection re-establishment succeeds only if the concerned cell is prepared, i.e. has a valid UE context. In case network accepts the re-establishment, SRB1 operation resumes while the operation of other radio bearers remains suspended. If AS security has not been activated, the UE does not initiate the RRC connection re-establishment procedure but instead moves to RRC_IDLE directly.

When AS security has not been activated, a NB-IoT UE supporting RRC connection re-establishment for the control plane CIoT EPS optimization in RRC_CONNECTED may initiate the RRC connection re-establishment procedure in order to continue the RRC connection.

The network applies the RRC connection re-establishment procedure as follows:
When AS security has been activated, to reconfigure SRB1 and to resume data transfer only for this RB and/or to re-activate AS security without changing algorithms.
For a NB-IoT UE supporting RRC connection re-establishment for the control plane CIoT EPS optimization, when AS security has not been activated, to re-establish SRB1bis and to continue data transfer for this RB.

Figure 11:
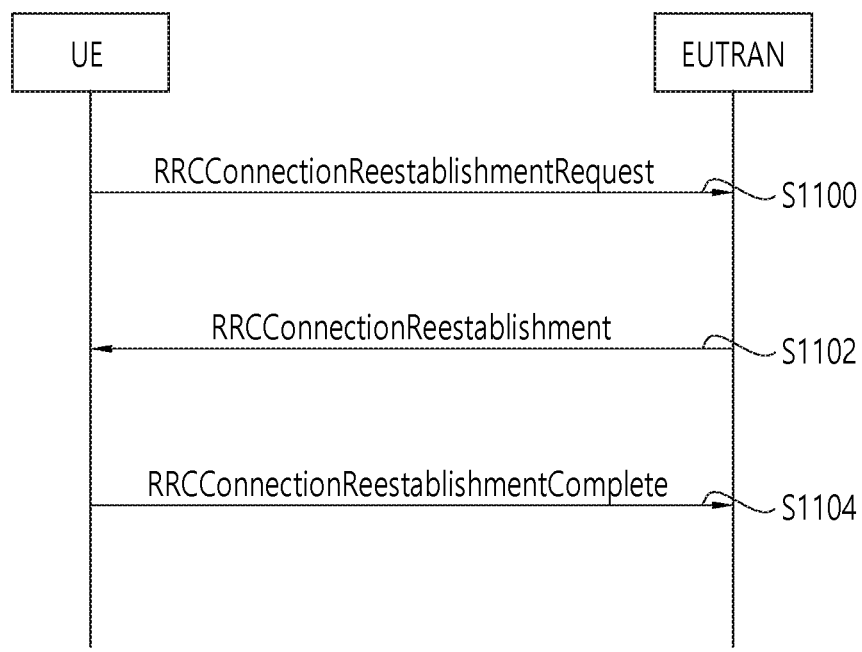
FIG. 11 shows an RRC connection re-establishment procedure.

FIG. 11 shows an RRC connection re-establishment procedure. Referring to FIG. 11, in step S1100, the UE transmits RRCConnectionReestablishmentRequest message to the network. In step S1102, the network transmits RRCConnectionReestablishment message to the UE. In step S1104, the UE transmits RRCConnectionReestablishmentComplete message to the network.

As mentioned above, for fast data transmission whose size is relatively is small, the EDT procedure has been introduced. Upon connection establishment request for MO data from the upper layers, the UE initiates the EDT procedure for control plane CIoT EPS optimizations. Upon connection resumption request for MO data from the upper layers, the UE initiates the EDT procedure for user plane CIoT EPS optimizations. Only MO data is subject to the EDT procedure, but MO signaling is not subject to the EDT procedure.

Therefore, there may be a case that NAS signaling is triggered (i.e. can be transmitted by the EDT procedure for control plane CIoT EPS optimizations), while the UE is in RRC_INACTIVE (i.e. the UE can perform the EDT procedure for user plane CIoT EPS optimizations). If such mismatch occurs between data to be transmitted and the EDT procedure which can be performed, there is no way to transmit the triggered NAS signaling by using the EDT procedure (i.e. via MSG3). Currently, NAS signaling and/or SMS is not subject to the EDT procedure.

Furthermore, when the UE transmits the RRCConnectionResumeRequest message for the EDT procedure for user plane CIoT EPS optimizations, the UE resumes all SRBs and DRBs. However, there may be a case that only resumption of SRBs is necessary. For example, a single establishment cause value may be used to specify both periodic and mobility based RAN notification area update (RNAU) procedure, and if registration update and RNAU are triggered simultaneously (i.e. at change of timing advance (TA)), then the UE may perform tracking area update (TAU) procedure, meaning that the RRC resume procedure uses the cause value associated with the TAU (e.g. MO signaling). In this case, it is likely the UE in RRC_INACTIVE needs only signaling connection and the connection sill be released unless new DL data arrives in the network. However, the probability that new DL data arrives between start and end of MO signaling may be very low. Thus, in this case, it is reasonable the network resume SRB only. Currently, even DRBs are resumed in the RRC connection resume procedure, which is not necessary.

1. Embodiment 1

According to the embodiment 1 of the present invention, resumption of SRB only may be supported. If the network receives an RRC message (e.g. RRC resume request message) with MO signaling (e.g. NAS signaling), the network may resume only SRB unless DL data exists. More specifically, when the UE is in RRC_INACTIVE and/or RRC connection is suspended (or EPS CM idle state (ECM_IDLE) with suspend indication), the UE may send an RRC message to request selective resumption of SRB(s) and/or DRB(s) while performing the RRC connection resume procedure. The RRC message may include the information about SRB(s) and/or DRB which the UE intends to resume. Upon receiving the RRC message including the information, the network may perform RRC procedure (or transmit response RRC message) to resume only the selectively requested SRB(s) and/or DRB(s).

The embodiment 1 of the present invention may also be applied when the UE performs only RRC signaling procedure (for vehicle-to-everything (V2X) transmission and/or minimization of drive tests (MDT)). Additionally, in 5GC, the embodiment 1 of the present invention may also be applied when the UE in IDLE mode performs service request procedure to establish signaling connection only.

The following description may be applied to both LTE-A and NR. For example, in the following description, BS/eNB/gNB/NG-RAN node may be used in a mixed manner, and MME/AMF may also be used in a mixed manner.

Figure 12:
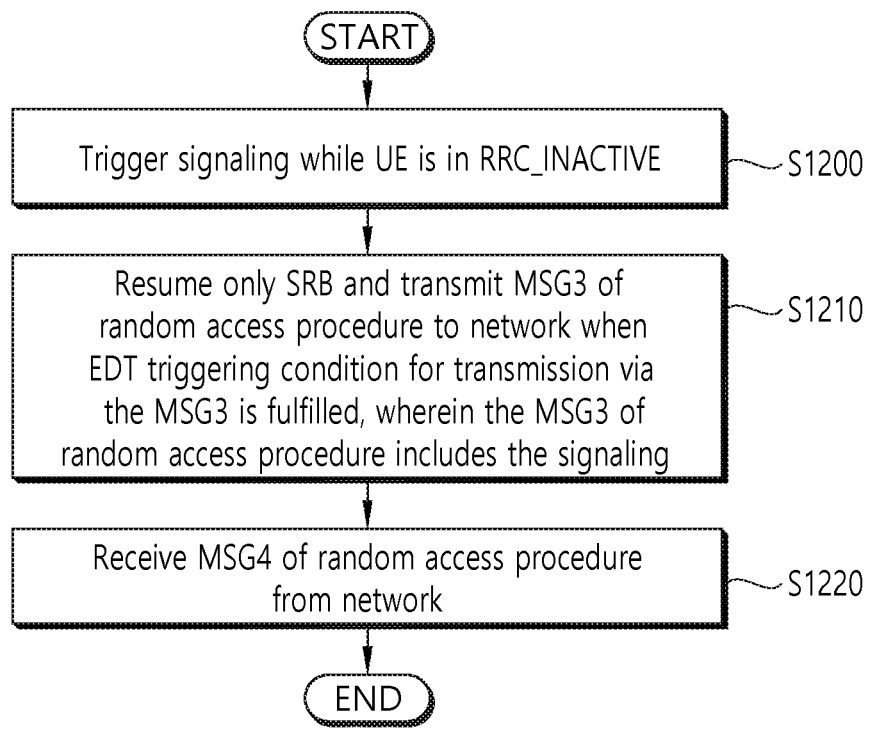
FIG. 12 shows an example of a method for resuming only SRB according to an embodiment 1 of the present invention.

FIG. 12 shows an example of a method for resuming only SRB according to an embodiment 1 of the present invention. This embodiment may be performed by a UE and/or wireless device. The UE and/or wireless device may be in communication with at least one of a user equipment, a network, and/or autonomous vehicles other than the wireless device.

In step S1200, the UE triggers a signaling while the UE is in RRC_INACTIVE. The signaling may be one of RRC signaling or NAS signaling.

In step S1210, the UE resumes only SRB and transmits MSG3 of a random access procedure to a network when an EDT triggering condition for transmission via the MSG3 is fulfilled. The MSG3 includes the signaling.

The MSG3 may be one of an RRC connection resume request message including the signaling, an RRC early data request message including the signaling and/or a new RRC message including the signaling. The MSG3 may include a cause indicating at least one of i) signaling only, ii) only the SRB is resumed, iii) no further UL data, and/or iv) MO signaling.

The EDT triggering condition may be one of release assistance information (RAI) and/or an indication indicating that no further UL data or signaling is expected. Or, the EDT triggering condition may be that a NAS layer of the UE have requested resumption of an RRC connection and a size of the MSG3 for EDT is less than or equal to a TBS indicated in system information.

In step S1220, the UE receives MSG4 of the random access procedure from the network. The MSG4 may include an indication that only the SRB is resumed when the network resumes only the SRB.

The MSG4 may be one of an RRC connection release message including the indication, an RRC early data complete including the indication, an RRC connection resume message including the indication and/or a new RRC message including the indication. The MSG4 may include a resume ID of the UE.

Only the signaling may be triggered, and user plane data may not be triggered. Alternatively, user plane data may be triggered in the UE. In this case, the UE transmits an RRC message to the network. The RRC message may include at least one of an indication to resume DRBs, a logical channel ID related to the DRBs, and/or IDs of the DRBs. The UE may resume a DRB corresponding to the user plane data.

According to embodiment of the present invention shown in FIG. 12, the triggered signaling can be transmitted by using the EDT procedure while the UE is in RRC_INACTIVE. Therefore, the triggered signaling can be transmitted quickly without transiting to RRC_CONNECTED. Furthermore, only SRB can be resumed and unnecessary DRB resumption can be avoided.

Figure 13:
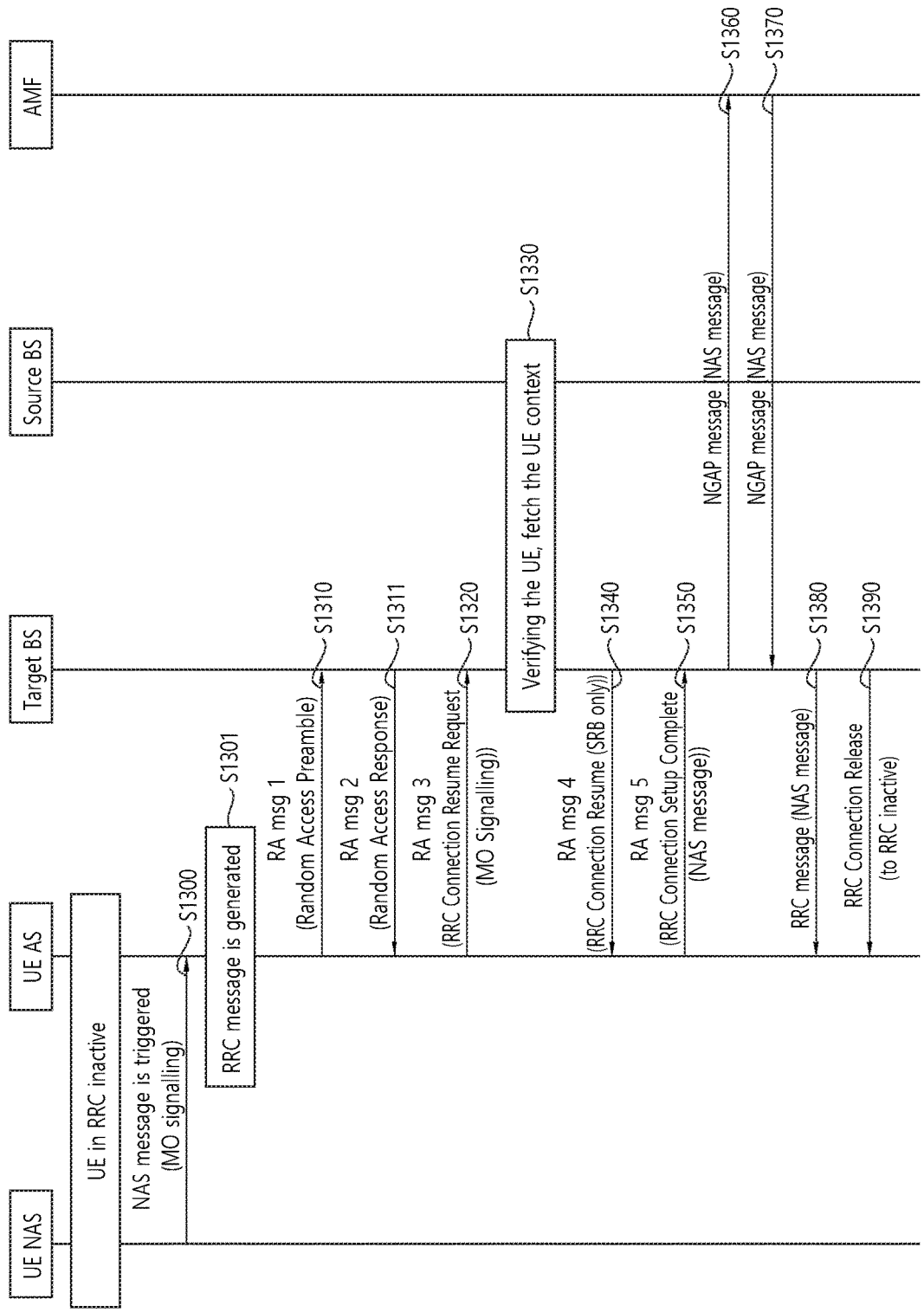
FIG. 13 shows another example of a method for resuming only SRB according to an embodiment 1 of the present invention.

FIG. 13 shows another example of a method for resuming only SRB according to an embodiment 1 of the present invention. In this example, only SRB is resumed while the UE is in RRC_INACTIVE.

While the UE is in RRC_INACTIVE, UL signaling is triggered. The UL signaling may be NAS signaling and/or NAS message. There are two cases as follows.

(1) The NAS layer of the UE may trigger NAS procedure. Currently, when the UE performs service request procedure to establish signaling connection only, RRC establishment/resume cause is not clarified. The RRC establishment/resume cause may be MO signaling and/or MO data.

(2) The AS layer (i.e. RRC layer) of the UE may trigger RRC procedure without involving NAS layer.

In FIG. 13, the NAS layer of the UE triggers NAS procedure. That is, in step S1300, the NAS message is triggered at the NAS layer and forwarded to the AS layer with MO signaling as RRC establishment/resume cause. In step S1301 the AS layer generates the RRC message.

In step S1310, the AS layer of the UE transmits MSG1 of the random access procedure to the BS. In step S1311, the AS layer of the UE receives MSG2 of the random access procedure from the BS.

In step S1320, the AS layer of the UE transmits MSG3 of the random access procedure to the BS. The MSG3 may include RRC connection resume request message with MO signaling as RRC establishment/resume cause. The MO signaling as the establishment/resume cause may be replaced with one of followings.

New establishment/resume cause, e.g. signaling only, SRB resume only, and/or no further UL data (no further UL data and/or signaling is expected)

New indication indicating, e.g. signaling only, SRB resume only, and/or no further UL data (no further UL data and/or signaling is expected). If the new indication is used, any RRC establishment/resume cause may be used. That is, if the new indication is used, there may be no dependency with RRC establishment/resume cause.

In step S1330, upon reception of the MSG3 including the RRC connection resume request message from the UE, the BS may perform procedure to verify the UE and fetch the UE context from the source BS (i.e. old BS/last serving BS). It is assumed that the verification and UE context fetch is successful in this example.

In step S1340, if the BS received the RRC establishment/resume cause or the new establishment/resume cause or the new indication specified in step S1320, the BS resumes only SRB and send an RRC message with indication of 'SRB resume only' unless DL data for the UE arrives at the BS. The RRC message may be one of an RRC connection resume message or other existing RRC message (e.g. RRC connection setup message) or new RRC message.

In step S1350, upon receiving the RRC message from the BS, the UE considers only SRB is resumed and transmits the triggered NAS message via RRC connection setup complete message. In step S1360, the BS transmits the NAS message to the AMF via NGAP message.

Furthermore, in step S1370, the AMF may transmit the NAS message to the BS via NGAP message. In step S1380, the BS may transmit the NAS message to the UE via RRC message.

In step S1390, the BS performs RRC connection release procedure to make the UE enter RRC_INACTIVE and/or RRC_IDLE.

Alternatively, if DL data arrives at the gNB before step S1340, the BS may transmit an RRC message (e.g. legacy RRC connection resume message) without the indication of 'SRB resume only' to resume DRBs as well as SRB. Alternatively, if DL data arrives at the gNB after step S1340, the BS may transmit an RRC message without the indication of 'SRB resume only' to resume DRBs as well as SRB. The RRC message may be one of legacy RRC connection resume message or RRC connection reconfiguration message or new RRC message. In both cases, the BS may resume DRB(s) only corresponding to the DL data. LCD related to the resumed DRB(s) and/or DRB ID(s) related to the resumed DRB(s) may be included in the RRC message.

Alternatively, if UL data is triggered in the UE after step S1320, the UE may transmit an RRC message to resume DRB(s). The RRC message may include an indication to resume DRBs, such as 'DRB resume'. The UE may resume DRB(s) only corresponding to the UL data. LCID related to the resumed DRB(s) and/or DRB ID(s) related to the resumed DRB(s) may be included in the RRC message. The RRC message may be the RRC connection resume request message not including fields such as resumeCause, resumeIdentity, shortResumeMAC-I. Alternatively, if UL data is triggered in the UE after step S1320 before step S1340, the RRC message may be RRC connection setup complete message. Alternatively, the RRC message may be a new RRC message which is used to resume DRB(s).

According to embodiment of the present invention shown in FIG. 13, only SRB can be resumed and unnecessary DRB resumption can be avoided.

Figure 14:
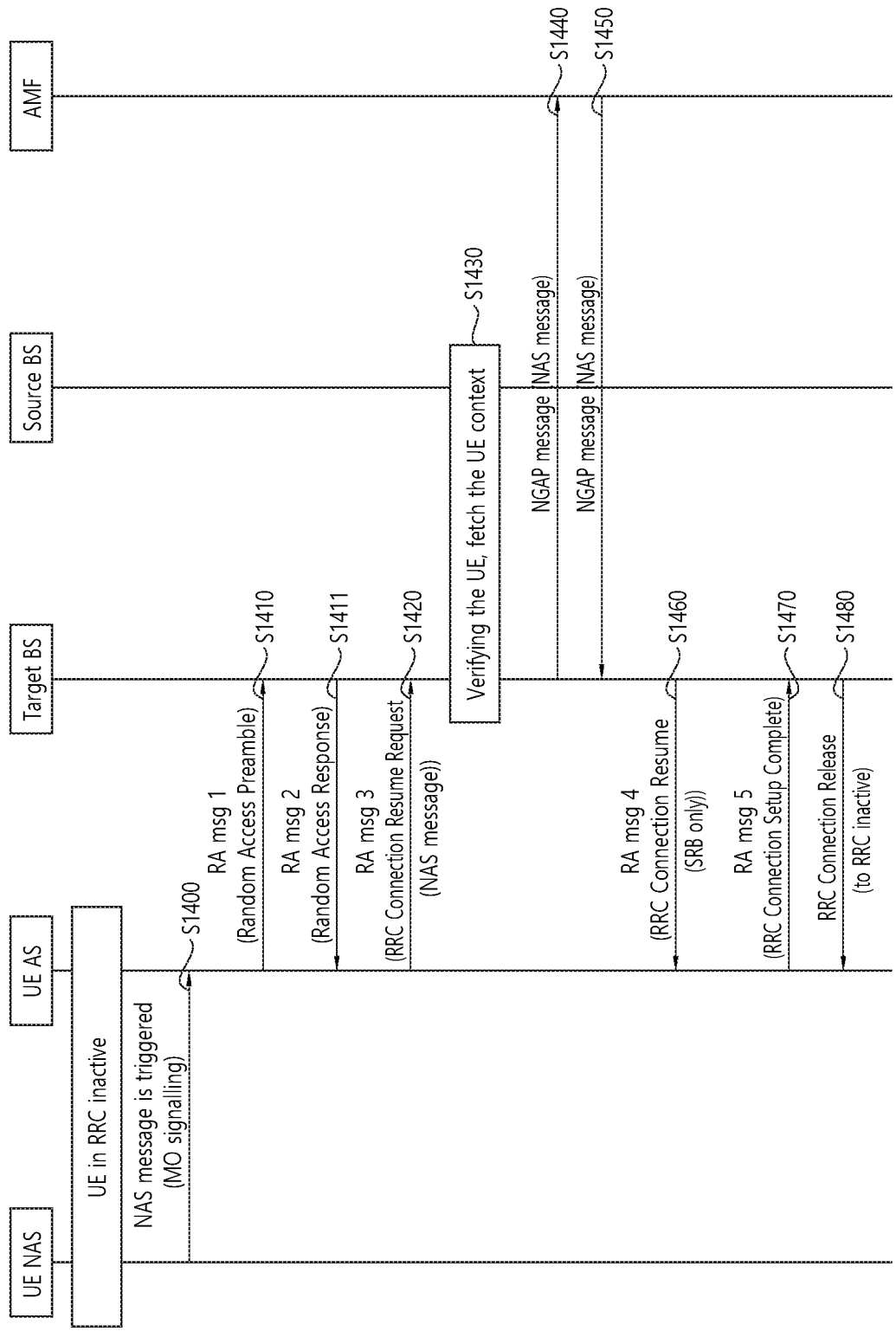
FIG. 14 shows another example of a method for resuming only SRB according to an embodiment 1 of the present invention.

FIG. 14 shows another example of a method for resuming only SRB according to an embodiment 1 of the present invention. In this example, only SRB is resumed in RRC_INACTIVE to transmit NAS signaling (i.e. CP EDT) by using the EDT procedure. That is, the UE in RRC_INACTIVE performs the EDT procedure to transmit CP EDT and/or NAS signaling via MSG3 (for UL signaling) and/or MSG4 (for DL signaling).

In step S1400, while the UE is in RRC_INACTIVE, CP EDT and/or NAS signaling (i.e. MO signaling) is triggered at the NAS layer and forwarded to the AS layer.

In step S1410, the AS layer of the UE transmits MSG1 of the random access procedure to the BS. In step S1411, the AS layer of the UE receives MSG2 of the random access procedure from the BS.

In step S1420, the AS layer of the UE transmits MSG3 of the random access procedure to the BS when EDT triggering conditions are met. The MSG3 may include RRC message, and the RRC message may include the NAS message including NAS PDU (i.e. CP data) and/or the NAS signaling. The EDT triggering conditions may be at least one of i) release assistance information (RAI), ii) indication that no further UL data and/or signaling is expected is received from the NAS layer, or iii) the NAS layer have requested resumption of RRC connection and a size of the NAS signaling is less than or equal to TBS indicated in system information. The RRC message may be RRC connection resume request message. The RRC connection resume request message may include all existing fields in the RRC connection resume request message and additionally NAS container such as dedicatedInfoNAS to include the NAS message. Or, the RRC message may be RRC early data request message.

In step S1430, upon reception of the MSG3 including the RRC message from the UE, the BS may perform procedure to verify the UE and fetch the UE context from the source BS (i.e. old BS/last serving BS). It is assumed that the verification and UE context fetch is successful in this example.

In step S1440, the BS transmits the NAS message received in step S1420 to the AMF via NGAP message.

In step S1450, the AMF may transmit the NAS message to the BS via NGAP message.

In step S1460, the BS may transmit the NAS message received in step S1450 to the UE via RRC message.

If the BS does not have DL data for the UE and no further data are expected, the RRC message may be RRC connection release message and/or RRC early data complete message or new RRC message. The BS may transmit the RRC message either to keep the UE in RRC_INACTIVE or transit the UE to RRC_IDLE. The RRC message may include resume ID of the UE and/or additionally may include NAS container such as dedicatedInfoNAS to include the NAS message.

If the BS has DL data for the UE or further data are expected, if DL data arrives at the gNB before step S1460, the BS may transmit an RRC message (e.g. legacy RRC connection resume message) without the indication of 'SRB resume only' to resume DRBs as well as SRB. Alternatively, if DL data arrives at the gNB after step S1460, the BS may transmit an RRC message without the indication of 'SRB resume only' to resume DRBs as well as SRB. The RRC message may be one of legacy RRC connection resume message or RRC connection reconfiguration message or new RRC message. In both cases, the BS may resume DRB(s) only corresponding to the DL data. LCID related to the resumed DRB(s) and/or DRB ID(s) related to the resumed DRB(s) may be included in the RRC message.

In step S1470, the UE transmits MSG5 of the random access procedure, e.g. RRC connection setup complete message, to the BS.

In step S1480, the BS performs RRC connection release procedure to make the UE enter RRC_INACTIVE and/or RRC_IDLE.

Alternatively, if UL data is triggered in the UE after step S1420, the UE may transmit an RRC message to resume DRB(s). The RRC message may include an indication to resume DRBs, such as 'DRB resume'. The UE may resume DRB(s) only corresponding to the UL data. LCID related to the resumed DRB(s) and/or DRB ID(s) related to the resumed DRB(s) may be included in the RRC message. The RRC message may be the RRC connection resume request message not including fields such as resumeCause, resumeIdentity, shortResumeMAC-I. Alternatively, if UL data is triggered in the UE after step S1420 before step S1460, the RRC message may be RRC connection setup complete message. Alternatively, the RRC message may be a new RRC message which is used to resume DRB(s).

According to embodiment of the present invention shown in FIG. 14, the triggered NAS signaling can be transmitted by using the EDT procedure while the UE is in RRC_INACTIVE. Therefore, the triggered NAS signaling can be transmitted quickly without transiting to RRC_CONNECTED. Furthermore, only SRB can be resumed and unnecessary DRB resumption can be avoided.

For another example of the embodiment 1 of the present invention, RRC connection may be suspended. In this case, the state of the UE in the example shown in FIG. 13 is RRC_IDLE, while the state of the UE in the example shown in FIG. 14 is RRC_INACTIVE. Then, only difference between the example shown in FIG. 13 and the example shown in FIG. 14 is that in NGAP (or S1AP) procedure (i.e. step S1360 in FIG. 13 or step S1440 in FIG. 14), the BS does not perform NGAP (or S1AP) procedure to request UE context resume to the AMF (or MME), but send the NAS message to the AMF (or MME) if the BS receives RRC resume request message with SRB only.

For another example of the embodiment 1 of the present invention, the BS may successfully verify the UE and fetch the UE context, but may not able to resume some of SRB(s) and/or DRB(s). That is, even though the target BS successfully completes verification of the UE and fetch the UE context, the target BS may not resume some of SRB(s) and/or DRB(s). Then, the target BS may indicate information about SRB(s) and/or DRB(s) which are failed to be resumed (and/or information about SRB(s) and/or DRB(s) which are successfully resumed), the reason of failure, and/or a back-off timer in case of temporary reason (e.g. due to congestion of radio resource) to the UE.

For example, if the UE requests resume all suspended SRB(s) and DRB(s) but the target BS cannot resume SRB2 and DRB(s), the target BS may transmit an indication indicating that resumption of SRB2 and DRB(s) is failed to the UE via RRC connection resume message. The RRC connection resume message may include cause/reason of failure as follows.
 Temporary failure (due to radio condition): The UE context for corresponding SRB(s) and/or DRB(s) which are failed to be resumed are kept as suspended
 Permanent failure: The UE context for corresponding SRB(s) and/or DRB(s) which are failed to be resumed are removed.

For the temporary failure, the UE context for corresponding SRB(s) and/or DRB(s) which are failed to be resumed are kept as suspended. In this case, timer value may be provided to the UE. Or, the timer value may be pre-configured in the UE. Upon receiving the temporary failure as the reason of failure with the timer value, the UE may set the timer with the timer value and start timer. If the timer is expired, the UE may request resume the SRB(s) and/or DRB(s) which are failed to be resumed before. Regardless of expiry of the timer, the target BS may resume the SRB(s) and/or DRB(s) which are failed to be resumed before whenever possible. The way to resume SRB(s) and/or DRB(s) specified in the other examples may be applied to this example.

2. Embodiment 2

Currently, upon receiving the RRC connection re-establishment request message from the UE in the RRC connection re-establishment procedure, and verification for the UE and fetching the UE context are successfully completed, the BS transmits RRC connection re-establishment message back to the UE to resume SRB1, and after that, sends RRC connection reconfiguration message to the UE to resume SRB2, SRB3 and DRB. According to the embodiment 2 of the present invention, when the UE in RRC_CONNECTED performs RRC connection re-establishment procedure, the UE may send RRC message to request selective resumption of SRB(s) and/or DRB(s). The RRC message may include information about SRB(s) and/or DRB which the UE intends to resume. Upon receiving the RRC message with the information, the BS may perform RRC procedure (or transmit response RRC message) to resume only the requested SRB(s) and/or DRB(s).

For example, if the UE in RRC_CONNECTED intends to resume SRB1 only (SRB only), the UE in RRC_CONNECTED transmits an RRC connection re-establishment request message with indication of SRB1 only (or SRB only) in the RRC connection re-establishment procedure. Upon receiving the RRC connection re-establishment request message with the indication of SRB1 only (or SRB only), if the BS successfully verify the UE and resumes SRB1, the BS may transmit only corresponding RRC messages to resume SRB1 only, not other RRC messages to resume other SRB(s) and DRB. The corresponding RRC messages may include RRC connection re-establishment message with SRB1 only (or SRB only), and may not include RRC connection reconfiguration message.

This example is based on current requirements/behaviour. In future, RRC message to resume each SRB and/or DRB may be changed. For example, all SRB(s) may be resumed via RRC connection re-establishment procedure in the future.

Figure 15:
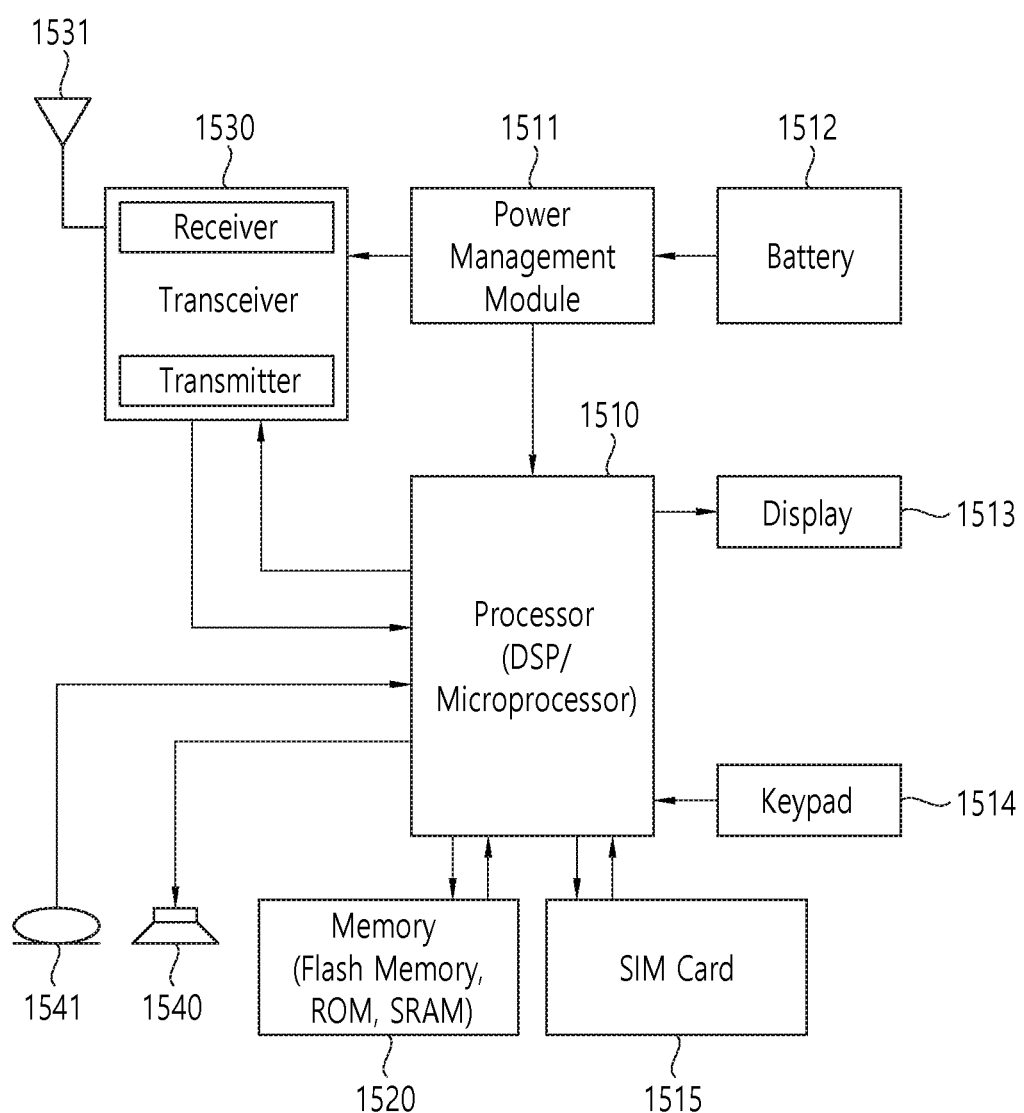
FIG. 15 shows a UE to implement an embodiment of the present invention.

FIG. 15 shows a UE to implement an embodiment of the present invention. The present invention described above for UE side may be applied to this embodiment.

A UE includes a processor 1510, a power management module 1511, a battery 1512, a display 1513, a keypad 1514, a subscriber identification module (SIM) card 1515, a memory 1520, a transceiver 1530, one or more antennas 1531, a speaker 1540, and a microphone 1541.

The processor 1510 may be configured to implement proposed functions, procedures and/or methods described in this description. Layers of the radio interface protocol may be implemented in the processor 1510. The processor 1510 may include application-specific integrated circuit (ASIC), other chipset, logic circuit and/or data processing device. The processor 1510 may be an application processor (AP). The processor 1510 may include at least one of a digital signal processor (DSP), a central processing unit (CPU), a graphics processing unit (GPU), a modem (modulator and demodulator). An example of the processor 1510 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1510 may be configured to trigger a signaling while the UE is in RRC_INACTIVE. The signaling may be one of RRC signaling or NAS signaling. The processor 1510 may be configured to resume only SRB.

The processor 1510 may be configured to control the UE to transmit MSG3 of a random access procedure to a network when EDT triggering condition for transmission via the MSG3 is fulfilled. The MSG3 includes the signaling.

The MSG3 may be one of an RRC connection resume request message including the signaling, an RRC early data request message including the signaling and/or a new RRC message including the signaling. The MSG3 may include a cause indicating at least one of i) signaling only, ii) only the SRB is resumed, iii) no further UL data, and/or iv) MO signaling.

The EDT triggering condition may be one of RAI and/or an indication indicating that no further UL data or signaling is expected. Or, the EDT triggering condition may be that a NAS layer of the UE have requested resumption of an RRC connection and a size of the MSG3 for EDT is less than or equal to a TBS indicated in system information.

The processor 1510 may be configured to control the UE to receive MSG4 of the random access procedure from the network. The MSG4 may include an indication that only the SRB is resumed when the network resumes only the SRB.

The MSG4 may be one of an RRC connection release message including the indication, an RRC early data complete including the indication, an RRC connection resume message including the indication and/or a new RRC message including the indication. The MSG4 may include a resume ID of the UE.

Only the signaling may be triggered, and user plane data may not be triggered. Alternatively, user plane data may be triggered in the UE. In this case, the processor 1510 may be configured to control the UE to transmit an RRC message to the network. The RRC message may include at least one of an indication to resume DRBs, a logical channel ID related to the DRBs, and/or IDs of the DRBs. The processor 1510 may be configured to resume a DRB corresponding to the user plane data.

The power management module 1511 manages power for the processor 1510 and/or the transceiver 1530. The battery 1512 supplies power to the power management module 1511. The display 1513 outputs results processed by the processor 1510. The keypad 1514 receives inputs to be used by the processor 1510. The keypad 1514 may be shown on the display 1513. The SIM card 1515 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1520 is operatively coupled with the processor 1510 and stores a variety of information to operate the processor 1510. The memory 1520 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1520 and executed by the processor 1510. The memory 1520 can be implemented within the processor 1510 or external to the processor 1510 in which case those can be communicatively coupled to the processor 1510 via various means as is known in the art.

The transceiver 1530 is operatively coupled with the processor 1510, and transmits and/or receives a radio signal. The transceiver 1530 includes a transmitter and a receiver. The transceiver 1530 may include baseband circuitry to process radio frequency signals. The transceiver 1530 controls the one or more antennas 1531 to transmit and/or receive a radio signal.

The speaker 1540 outputs sound-related results processed by the processor 1510. The microphone 1541 receives sound-related inputs to be used by the processor 1510.

According to embodiment of the present invention shown in FIG. 15, the triggered signaling can be transmitted by using the EDT procedure while the UE is in RRC_INACTIVE. Therefore, the triggered signaling can be transmitted quickly without transiting to RRC_CONNECTED. Furthermore, only SRB can be resumed and unnecessary DRB resumption can be avoided.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device adapted to operate in a wireless communication system, the method comprising:
   suspending all radio bearers (RBs) including a signaling radio bearer (SRB) and a data radio bearer (DRB);
   triggering a mobile originating (MO) signaling while the wireless device is in a radio resource control (RRC) inactive state, wherein the MO signaling is related to a non-access stratum (NAS) procedure triggered by an NAS layer of the wireless device or an RRC procedure triggered by an RRC layer of the wireless device;
   transmitting, to a base station, a random access preamble;
   receiving, from the base station, a random access response in response to the random access preamble;
   determining that a triggering condition for transmission of the MO signaling while in the RRC inactive state is fulfilled;
   based on the triggering condition for transmission of the MO signaling while in the RRC inactive state being fulfilled, transmitting, to the base station, an RRC resume request message including a cause, wherein the cause informs "MO signaling only";
   based on downlink (DL) data not arriving at the base station:
   i) receiving, from the base station, an RRC resume message in response to the RRC resume request message, wherein the RRC resume message includes information informing that only the SRB is resumed but the DRB is not resumed;
   ii) based on the information, resuming only the SRB but not the DRB; and
   iii) transmitting, to the base station, an RRC resume complete message in response to the RRC resume message based on the resumed SRB, wherein the RRC resume complete message includes an NAS message related to the triggered MO signaling.

2. The method of claim 1, wherein the triggering condition for transmission of the MO signaling while in the RRC inactive state includes at least one of release assistance information (RAI), information informing that no further UL data or signaling is expected, or that the NAS layer of the wireless device have requested resumption of an RRC connection and a size of the RRC resume request message is less than or equal to a transport block size (TBS) indicated in system information.

3. The method of claim 1, wherein the RRC resume message includes a resume identifier (ID) of the wireless device.

4. The method of claim 1, wherein, based on DL data arriving at the base station, the method further comprises comprising receiving, from the base station, the RRC resume message in response to the RRC resume request message, and
   wherein the RRC resume message does not include information informing that only the SRB is resumed but the DRB is not resumed.

5. The method of claim 4, wherein the method further comprises resuming the DRB related to the DL data.

6. The method of claim 1, wherein the wireless device is in communication with at least one of a user equipment, a network, or autonomous vehicles other than the wireless device.

7. A wireless device adapted to operate in a wireless communication system, the wireless device comprising:
- a transceiver;
- a processor; and
- a memory operably connectable to the processor and storing instructions that, based on being executed by the processor, perform operations comprising:
- suspending all radio bearers (RBs) including a signaling radio bearer (SRB) and a data radio bearer (DRB);
- triggering a mobile originating (MO) signaling while the wireless device is in a radio resource control (RRC) inactive state, wherein the MO signaling is related to a non-access stratum (NAS) procedure triggered by an NAS layer of the wireless device or an RRC procedure triggered by an RRC layer of the wireless device;
- transmitting, to a base station via the transceiver, a random access preamble;
- receiving, from the base station via the transceiver, a random access response in response to the random access preamble;
- determining that a triggering condition for transmission of the MO signaling while in the RRC inactive state is fulfilled;
- based on the triggering condition for transmission of the MO signaling while in the RRC inactive state being fulfilled, transmitting, to the base station via the transceiver, an RRC resume request message including a cause, wherein the cause informs "MO signaling only";
- based on downlink (DL) data not arriving at the base station:
  - i) receiving, from the base station via the transceiver, an RRC resume message in response to the RRC resume request message, wherein the RRC resume message includes information informing that only the SRB is resumed but a data radio bearer (DRB) is not resumed;
  - ii) based on the information, resuming only the SRB but not the DRB; and
  - iii) transmitting, to the base station via the transceiver, an RRC resume complete message in response to the RRC resume message based on the resumed SRB, wherein the RRC resume complete message includes an NAS message related to the triggered MO signaling.

8. A processing apparatus adapted to control a wireless device in a wireless communication system, the processing apparatus comprising:
- a processor; and
- a memory operably connectable to the processor, wherein the processor is configured to perform operations comprising:
- suspending all radio bearers (RBs) including a signaling radio bearer (SRB) and a data radio bearer (DRB);
- triggering a mobile originating (MO) signaling while the wireless device is in a radio resource control (RRC) inactive state, wherein the MO signaling is related to a non-access stratum (NAS) procedure triggered by an NAS layer of the wireless device or an RRC procedure triggered by an RRC layer of the wireless device;
- generating a random access preamble;
- obtaining a random access response in response to the random access preamble;
- determining that a triggering condition for transmission of the MO signaling while in the RRC inactive state is fulfilled;
- based on the triggering condition for transmission of the MO signaling while in the RRC inactive state being fulfilled, generating an RRC resume request message including a cause, wherein the cause informs "MO signaling only";
- based on downlink (DL) data not arriving at a base station:
  - i) obtaining an RRC resume message in response to the RRC resume request message, wherein the RRC resume message includes information informing that only the SRB is resumed but a data radio bearer (DRB) is not resumed;
  - ii) based on the information, resuming only the SRB but not the DRB; and
  - iii) generating an RRC resume complete message in response to the RRC resume message based on the resumed SRB, wherein the RRC resume complete message includes an NAS message related to the triggered MO signaling.

\* \* \* \* \*